United States Patent [19]
Chao et al.

[11] Patent Number: 5,029,163
[45] Date of Patent: Jul. 2, 1991

[54] SYNCHRONOUS PROTOCOL DATA FORMATTER

[75] Inventors: Phillip C.J. Chao, Naperville, Ill.; Bong S. Choe, Lebanon; Robert C. Fairfield, Randolph, both of N.J.; Thomas L. Hiller, Glen Ellyn; Robert W. King, Naperville, both of Ill.; Joel D. Peshkin, Heidelberg Township, Lehigh County, Pa.; Ralph A. Wilson, III, Wheaton, Ill.

[73] Assignee: AT&T Bell Laboratories, Murray Hill, N.J.

[21] Appl. No.: 169,687

[22] Filed: Mar. 18, 1988

[51] Int. Cl.$^5$ .............................................. H04J 3/16
[52] U.S. Cl. ...................... 370/95.1; 370/80
[58] Field of Search ............ 370/94, 95, 80, 79, 370/94.1, 94.2, 94.3, 95.1, 95.3

[56] References Cited

U.S. PATENT DOCUMENTS

| | | | |
|---|---|---|---|
| 4,429,383 | 1/1984 | Finck et al. | 370/80 |
| 4,630,261 | 12/1986 | Irvin | 370/95 |
| 4,641,304 | 2/1987 | Raychaudhuri | 370/95 |
| 4,736,371 | 4/1988 | Tejima et al. | 370/95 |

OTHER PUBLICATIONS

Harry T. French et al., "An Eight Channel Synchronous Data Controller for a Primary Rate Interface to ISDN," *Conf. Proceedings ICCD*, pp. 100-106 (1987).

*Primary Examiner*—Douglas W. Olms
*Assistant Examiner*—Wellington Chin
*Attorney, Agent, or Firm*—William Ryan

[57] ABSTRACT

A synchronous protocol data formatter handles all 24-32 channels of a so-called primary rate version of a digital multiplexed interface or ISDN Primary Rates Interface for a communication system. The formatter relieves the host computer of the local area network of some highly specialized tasks, and, at the same time, provides the following augmented capabilities, which exceed those required by the C.C.I.T.T. standard, I.431:

1. dynamic channel bandwidth allocation can assign arbitrary (even non-adjacent) time slots to create a super channel;
2. a circular interrupt-queue in a shared memory enables the formatter and the host computer of the local area network to interact efficiently in updating and responding to changing conditions; and
3. cyclical redundancy codes can be used on a more flexible basis than theretofore, e.g., can be generated upon only address and control fields for digitized voice signals, or, in a relay mode, can substitute an existing cyclical redundancy code to guard against memory errors.

6 Claims, 6 Drawing Sheets

FIG. 5

SUPER CHANNEL CONFIGURATIONS

| | MODE | TIME SLOTS | LOGICAL CHANNEL NO |
|---|---|---|---|
| CEPT 5 X H0 | F | 0 | 0 |
| | H0 | 1-6 | 1 |
| | H0 | 7-12 | 2 |
| | H0 | 13-15 & 17-19 | 3 |
| | H0 | 20-25 | 4 |
| | H0 | 26-31 | 5 |
| | S | 16 | 6 |
| CEPT | F | 0 | 0 |
| | H11 | 1-15 & 17-25 | 1 |
| | H0 | 26-31 | 2 |
| | S | 16 | 4 |
| CEPT | F | 0 | 0 |
| | H12 | 1-15 & 17-31 | 1 |
| | S | 16 | 2 |
| T1/DS1 4 X H0 | H0 | 1-6 | 1 |
| | H0 | 7-12 | 2 |
| | H0 | 13-18 | 3 |
| | H0 | 19-24 | 4 |
| T1/DS1 | H11 | 1-24 | 1 |

DYNAMIC CHANNEL ALLOCATION: HOST COMPUTER PROCEDURES

CHANNELS NOT DIRECTLY INVOLVED IN RECONFIGURATION ARE NOT INTERRUPTED

SYNCHRONOUS PROTOCOL DATA FORMATTER

FIELD OF THE INVENTION

This invention relates to synchronous protocol data formatters used in digital multiplexed interfaces, particularly the relatively high-frequency type called a primary rate interface, for an integrated services digital network (ISDN).

BACKGROUND OF THE INVENTION

In the recent rapid development of digital communication services, the general concept of an integrated services digital network has steadily gained ground. In other words, all contemplated services would be provided through the same digital network.

International Standards Organizations have moved quickly to foster this development. They have adapted standards for a line rate of 1.544 Mbits/s (primarily in North America and Japan) and 2.048 Mbits/s (most of the world) for a primary rate digital multiplexed interface.

While some commercial products exist for these purposes, each of them has drawbacks.

For example, some of them serve such a small number of channels that equipment costs and coordination problems quickly escalate. Others are insufficiently flexible to assure the customer of a communication link of the desired capacity whenever possible.

It is an object of this invention to solve the foregoing problems.

SUMMARY OF THE INVENTION

According to our invention, a synchronous protocol data formatter is adapted so that it can handle all the channels of a primary rate digital multiplexed interface, or can dynamically allocate adjacent or non-adjacent 64 kbits channels to create one or more "super channels".

According to another feature of our invention, the formatter includes a circular queue and "interrupt-queue" structure that facilitates the shared usage of a main memory by the formatter and by a host computer, or microprocessor, associated with the interface.

The interrupt-queue structure allows immediate access to the memory by the formatter, together with a notice pulse to the host computer, which still allows the host computer to continue some urgent priorities before accessing the memory itself.

According to another feature of our invention, the error-checking cyclic redundancy code (CRC) is calculated only upon the address and control fields when it is known that voice signals are being transmitted.

According to still another feature of our invention, the formatter prevents calculation of additional CRC when it is in the relay mode (e.g., transmission through a repeater) and, instead, passes through the prior CRC for the frame, to tend to guard against memory errors.

BRIEF DESCRIPTION OF THE DRAWING

Further features and advantages of the invention will become apparent from the following detailed description, taken together with the drawings, in which:

FIGS. 4–6 illustrate the flexibility of the dynamic channel allocation according to our invention;

DETAILED DESCRIPTION

Figure 1:
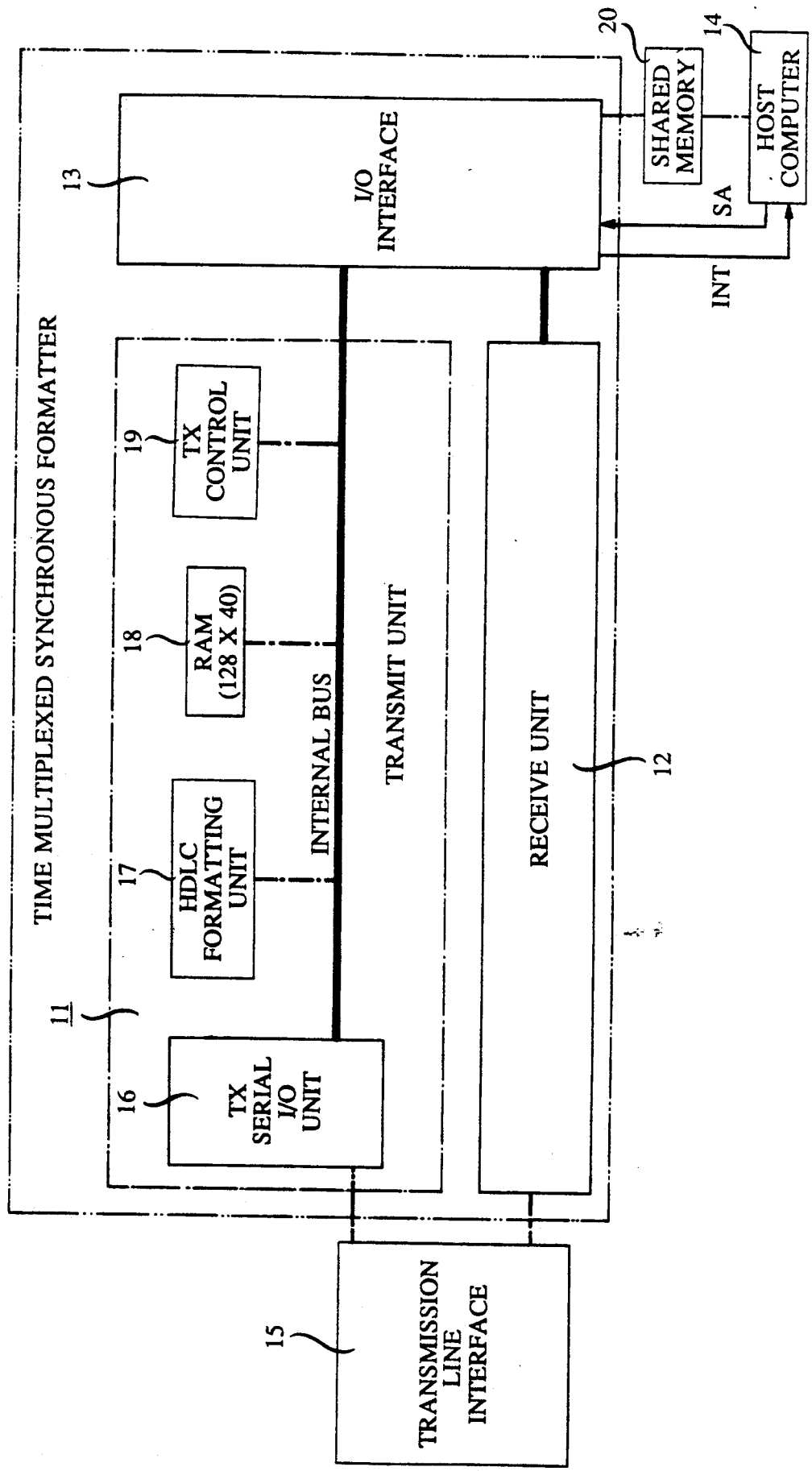
FIG. 1 is a block diagrammatic showing of the digital multiplexed interface application environment, in which a synchronous protocol data formatter according to our invention can be used.

In FIG. 1, a formatting digital multiplexed interface, which can be implemented according to our invention, includes the transmit unit 11, the receive unit 12, and I/O interface 13. Transmit unit 11 and receive unit 12 are generically termed a transceiver, providing necessary protocol, formatting and related general functions in coupling the local input/output interface 13, which serves, for example, a local host computer 14, to the transmission line interface 15 to the public, switched telephone network, or other information transport facility.

Before turning to the internal details of unit 11, let us consider the overall functions, as they have developed in the prior art. In the article "An Eight Channel Synchronous Data Controller for a Primary Rate Interface to ISDN", by Harry T. French, *Conf. Proceedings ICCD*, Rye, New York, Oct. 5, 1987, pp. 100–106, there is described an integrated circuit which is the immediate antecedent of the present invention.

> With regard to the synchronous formatter there described, it is stated: It relieves the host processor from low level formatting functions and provides the functions needed, such as CRC generation and checking, to provide link layer flow control and error recovery . . . [It] would see applications in front end processors, host computers, cluster controllers and high-end workstations.

Nevertheless, it has become desirable to reduce the required duplication of such eight (8)-channel circuits for 24-channel North American standard applications or 32-channel European (C.E.P.T.) standard applications as adopted by (C.C.I.T.T.).

Viewed as a front end processor for the host computer, the invention provides a single integrated circuit which greatly reduces the software needs and computing burden for the host computer.

Returning to FIG. 1, we see that transmit unit 11 includes the transmit serial input/output unit 16, the high-level data-link control (HDLC) unit 17, and a random access memory 18, which enables one synchronous formatter to keep track of all 32 independent channels.

Figure 2:
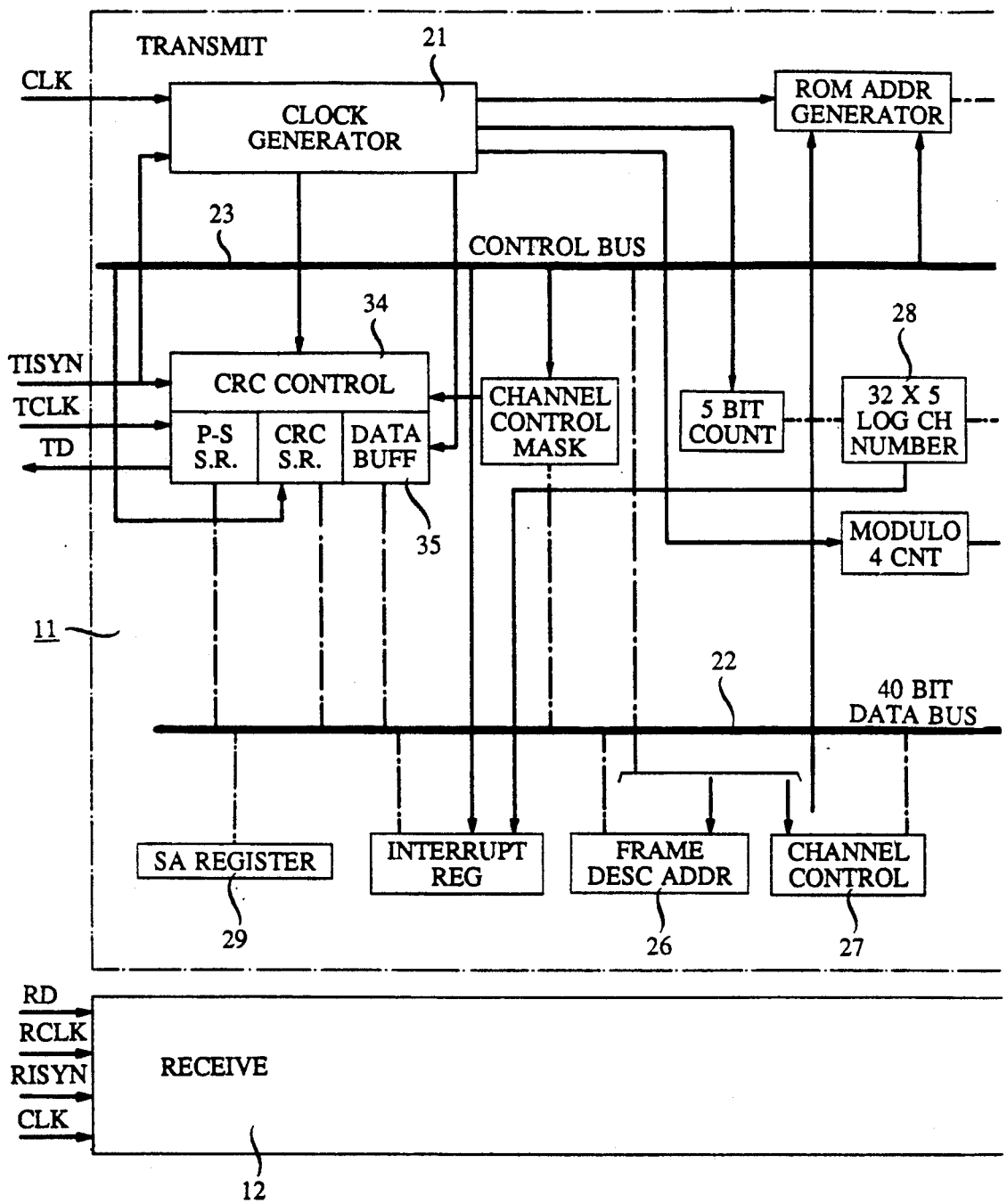
FIGS. 2 and 3 together are a block diagrammatic showing of a preferred embodiment of our invention.
Figure 7:
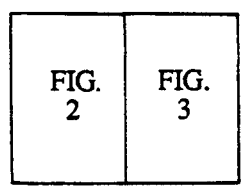
FIG. 7 shows the association of FIGS. 2 and 3.
Figure 3:
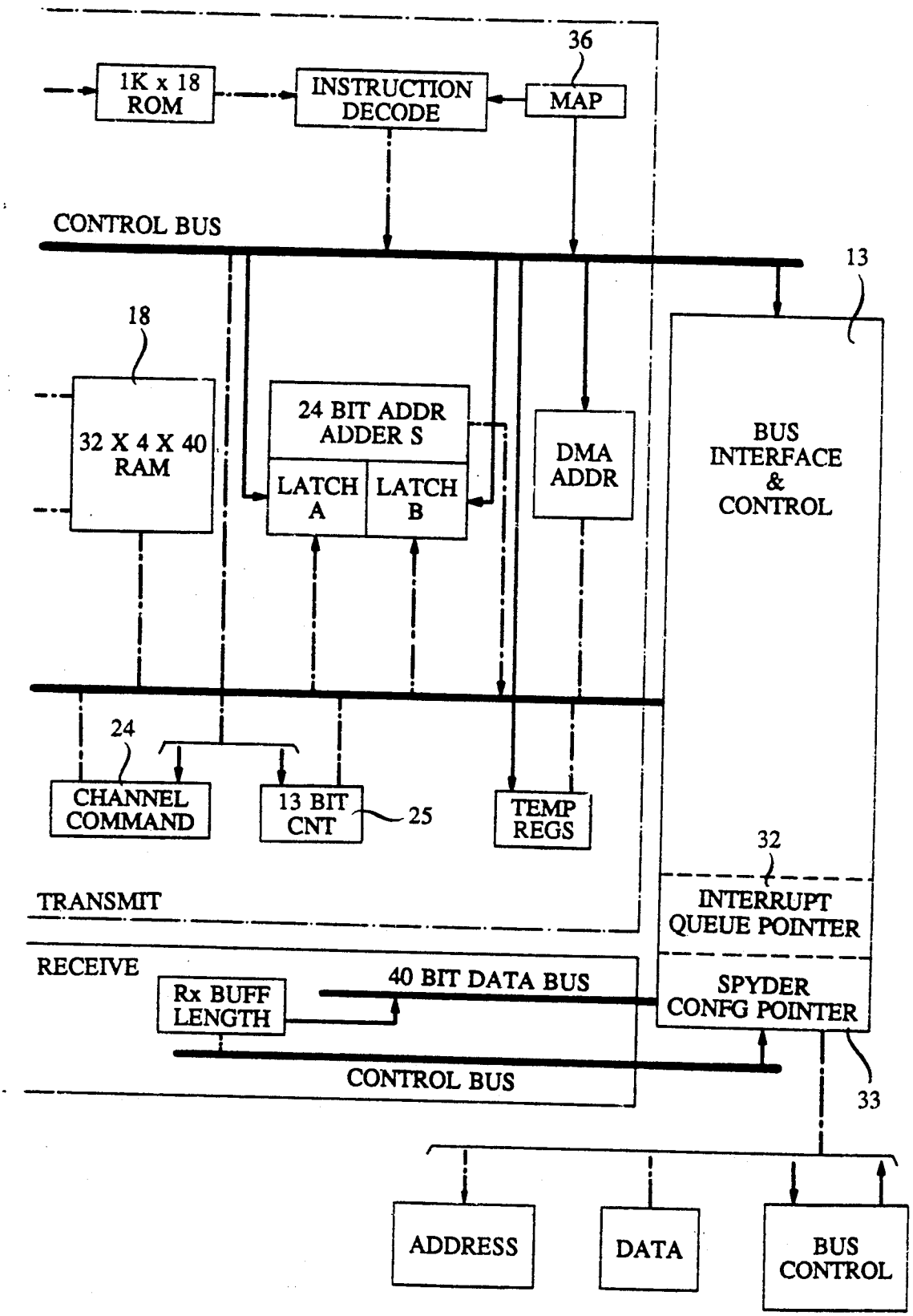

In the preferred embodiment of FIGS. 2 and 3, which fit together as shown in FIG. 7, there are shown in block diagrammatic form the elements that enable the dynamic channel allocation and the interrupt-queue structure, and other features, of the present invention.

Clock signals are generated in clock generator 21, responsive both to an external clock (CLK) and the various signals coming from the interface 15; and everything in units 11, 12 and 13 runs synchronously with the signal from the clock generator 21.

Data flows between interfaces 13 and 11 on the 40 bit data bus 22, but the various internal control signals flow within unit 11 on the control bus 23.

When host computer 14 places a command in shared memory 20, then sends a pulse on the SA lead to I/O interface 13, together indicating that a super channel of greater capacity than the 64k bit/s of a B (Bearer-general voice or data) or D (Data or Signaling channel) is needed, the synchronous formatter responds to the SA signal by reading the new information in the shared memory 20, which designates a sufficient number of channesl, and the proceeds to put together a channel of sufficient overall bandwidth.

Logical channel number circuit 28 plays an essential role in this process by mapping the locations of the timeslots into channels and super channels.

The interrupt-queue structure of the present invention is implemented as follows:

The circular interrrupt queue of up to 4096 words of 16 bits is set up in the shared memory 20. The queue is circular in that the last sequential position in the circular interrupt queue is sequentially linked to the first position, so that interrupt-queue pointer 32 in control 13 moves smoothly from the last position to the first.

The purpose of the interrupt queue is to store conditions (needing attention) found in the data handled in the synchronous formatter in the unit 11 or 12, respectively. To this end, the formatter has immediate access to the shared memory. Simultaneously, it advances the queue pointer 32 and sends an alert signal to the host computer 14 (shown in FIG. 1) on the INT lead.

If the host computer has more urgent processing priorities, it will temporarily ignore the interrupts, but the formatter has set a bit in the interrupt queue which will later lead the host computer to find the corresponding address in the interrupt queue, and proceed to do the appropriate processing, record updating, etc. The entries in the interrupt queue are dealt with strictly sequentially. The interlock mechanism we currently use is via the setting and clearing of a flag bit within each word in the circular interrupt queue. The formatter sets this bit when an interrupt condition is generated and advances the interrupt Q pointer held in the interface unit 13. The host after reading the circular queue clears this flag bit and advances its own interrupt Q pointer. In this way the host is always chasing the formatter around the circular queue. No problem can develop as long as the formatter pointer doesn't lap the host pointer.

The cyclical redundancy code (CRC) control 34 differs from the prior art in the flexibility with which the code can be calculated on the complete transmitted frame, or only upon the address and control fields in the case that voice signal data is currently being transmitted, or not at all in the relay mode.

If the device is programmed for voice signal processing then, in the receiver 12, the CRC register contents is frozen after some number of header bytes are received. As additional data is received a comparison is done between the frozen CRC and the newly received data. When a closing flag delimiter (0 1 1 1 1 1 1 0) is received the frozen CRC register contents will be equal to the previous two bytes (before flag) if there are no errors in the frame. The received CRC is always written to the shared memory 20 by the interface unit 13.

In the transmitter 11 the CRC register contents is frozen after some number of header bytes are transmitted. The frozen CRC is held until the end of the frame when it is transmitted prior to the closing flag delimiter.

In the event that unit 11 is in a frame relay application, memory access errors may be a principal source of error in the data. In that event, no new CRC is generated; and the prior value is passed directly from the shared memory 20 to the transmit unit 11 via the interface unit 13. The transmit CRC SR (part of 34) register is not used in this mode.

For the purpose of diagnostic testing, a corrupted CRC may be passed from the shared memory 20 to the transmit unit 11 via the interface unit 13. In other words, the system forces a CRC error in the test mode. This simulates a line error and can be used to check the receiving end circuitry.

Figure 4:
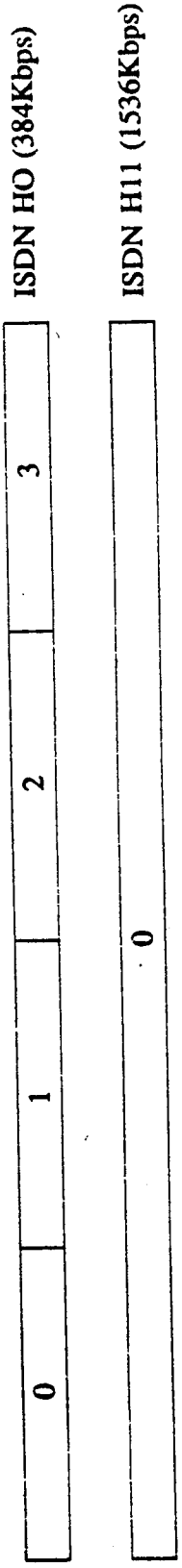

From FIG. 4, the relationship of our new dynamic channel allocation to the recently established International standards may be understood. The first line illustrates all 24 channels of the North American standard, of which the last (here, designated "23") must be the particular sort of data which comprises channel signaling data.

The second line illustrates the four standard 384 kbps super channels.

In fact, lines 2 and 3 in FIG. 4 illustrate super channel assignments which are described in detail in the new standard C.C.I.T.T.—recommendations of the Series I, I, 431, Geneva, 1985, but which are as equally well implemented by the circuitry of our invention to achieve the "mix and match" mode of the last line.

On the last line of FIG. 4 is illustrated the mixed regular channel-super channel allocations, according to our invention.

As a result of our invention, we see that portions of channel #1 may be separated in time by portions of channel #2 and vice-versa.

Two points should be observed. First, the host computer maps the time slots (and the formatter copies those choices into its MAP register 36) so that busy channels or time slots are not interferred with. Second, the mapping never allocates channel 23, or any other time slot or channel reserved for special functions, such as signalling, into a dynamic channel allocation according to our invention.

At the end of each 64 kbit/s time slot, the formatter does a context switch, storing partial information for that timeslot's channel in the internal RAM 18, and retrieves partial information for the next timeslot's channel. This architecture allows this very flexible channel allocation feature.

In other respects, the preferred embodiment operates in ways generally known and understood by workers of ordinary skill in the art.

For example, see the above-cited article by French et al.

Other possible standard super channel assignments are set out in the table of FIG. 5 and are believed to be self-explanatory.

Figure 6:
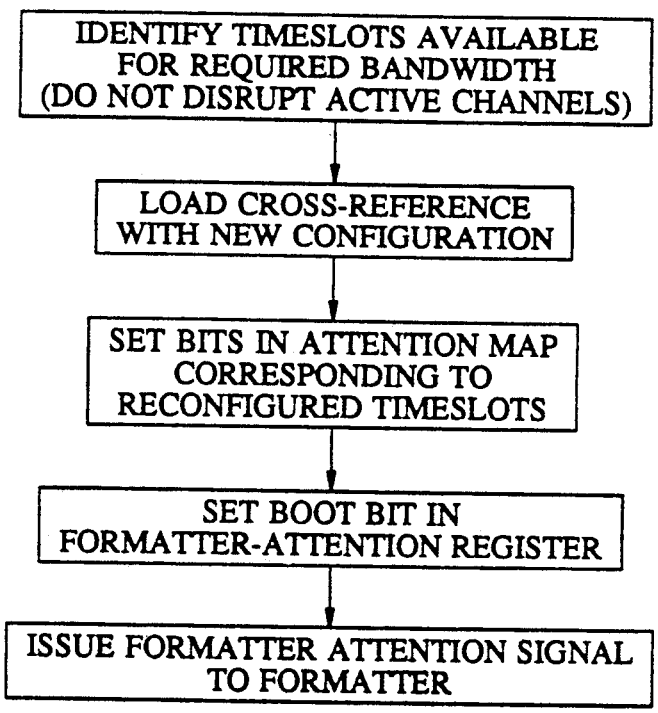

FIG. 6 shows a flow diagram, which states in words and in somewhat greater detail, the procedure followed (primarily by the host computer 14) in the dynamic channel allocation.

The "load cross-reference" step therein means that the host identifies which timeslots should be assigned to which channels and builds a cross-reference table containing the new assignments in the shared memory.

The "attention map" referred to is copied by the formatter from shared memory into the register 36 and identifies to the formatter which of the cross reference assignments of unit 28 in FIG. 2 have changed.

The "formatter attention register" identifies what type of reconfiguration the formatter is to undergo (i.e., reallocation, commands, new interrupt queue). The host computer writes all of the information described in the second through four the block of FIG. 6 into the shared memory 20. The host then pulses the SA pin (refer to FIG. 1) to accomplish the step of the fifth block in FIG.

6. Subsequently, the formatter reads the shared memory, updating the SA register 29 in the formatter and starting the reconfiguration process.

The foregoing description will suggest to the reader many possible variations within the scope of the invention.

What is claimed is:

1. A synchronous formatter for a data network interface of the type having means for allocating communication channel bandwidth to one or more applied messages through the allocation of time slots and means for performing protocol functions for the Integrated Service Digital Network (ISDN) Primary Rate Standard,
   characterized in that
   the means for allocating channel bandwidth includes means for allocating a plurality of time slots to each of said one or more messages without regard to adjacency of said plurality of time slots for use repetitively to communicate a message.

2. A synchronous formatter for a data network interface of the type having means for allocating communication bandwidth to one or more applied messages through the allocation of time slots and means for performing protocol functions,
   characterized in that
   the means for performing protocol functions includes means for calculating cyclical redundancy codes based on the content of said messages, said means for calculating comprising means for calculating said codes based on less than the entire content of said messages.

3. A synchronous formatter of the type claimed in claim 2,
   further characterized in that
   the means for calculating includes means for excluding any voice signal content of said messages in calculating said cyclical redundancy codes.

4. A synchronous formatter for a data network interface of the type having means for allocating communication bandwidth through the allocation of time slots and means for performing cyclical redundancy code checking on received data,
   further characterized by
   means for suppressing cyclical redundancy code checking and for transmitting the received cyclical redundancy code as received.

5. In combination, a host computer, a memory and a synchronous formatter for a data network interface of the type having means for allocating communication bandwidth through the allocation of time slots and means for performing protocol functions,
   characterized in that
   the means for performing protocol functions includes means for sharing said memory without conflict with said host computer, means for establishing a circular queue of items for the attention of the host computer, and means for issuing an attention signal to the host computer after each access of the shared memory by the formatter, when the attention of the host computer is likely to be required.

6. A synchronous formatter of the type claimed in claim 5,
   further characterized by
   means in said formatter including means for directing said host computer to an item requiring attention when said host computer failed to respond to a prior attention signal temporarily; and means for constraining the host computer to access items in the queue in the order in which they were entered there.

* * * * *